US012769131B2

(12) United States Patent
Eisenfeld et al.

(10) Patent No.: US 12,769,131 B2
(45) Date of Patent: Oct. 20, 2026

(54) OPTICAL SYSTEM FOR NEAR-EYE DISPLAYS

(71) Applicant: Lumus Ltd., Ness Ziona (IL)

(72) Inventors: Tsion Eisenfeld, Ashkelon (IL); Yochay Danziger, Kfar Vradim (IL); Jonathan Gelberg, Modiin (IL); Shimon Grabarnik, Rehovot (IL)

(73) Assignee: LUMUS LTD., Ness Ziona (IL)

( * ) Notice: Subject to any disclaimer, the term of this patent is extended or adjusted under 35 U.S.C. 154(b) by 309 days.

(21) Appl. No.: 18/702,394

(22) PCT Filed: Oct. 18, 2022

(86) PCT No.: PCT/IL2022/051100
§ 371 (c)(1),
(2) Date: Apr. 18, 2024

(87) PCT Pub. No.: WO2023/067594
PCT Pub. Date: Apr. 27, 2023

(65) Prior Publication Data

US 2024/0411137 A1 Dec. 12, 2024

Related U.S. Application Data

(60) Provisional application No. 63/277,184, filed on Nov. 9, 2021, provisional application No. 63/272,819, filed
(Continued)

(51) Int. Cl.
*G02B 27/01* (2006.01)
*G02B 26/10* (2006.01)
(Continued)

(52) U.S. Cl.
CPC ....... *G02B 27/0172* (2013.01); *G02B 26/101* (2013.01); *G02B 27/18* (2013.01); *H04N 9/3129* (2013.01)

(58) Field of Classification Search
CPC ................ G02B 27/01; G02B 27/0172; G02B 27/0179; G02B 27/183; G02B 27/18;
(Continued)

(56) References Cited

U.S. PATENT DOCUMENTS 6,829,095 B2 12/2004 Amitai
7,576,916 B2 8/2009 Amitai
(Continued)

*Primary Examiner* — Jie Lei
(74) *Attorney, Agent, or Firm* — Rivka Friedman

(57) ABSTRACT

An optical system includes a light-guide optical element (LOE) formed from transparent material and having parallel major external surfaces. A projector is configured to project illumination corresponding to a collimated image into the LOE via a reflective coupling-in configuration that includes an image injection surface coplanar with the first major external surface, a reflector surface obliquely angled to the major external surfaces, and a partially-reflecting surface parallel to the reflector surface. A first part of the intensity of the illumination of the collimated image is reflected by the partially-reflecting surface and a second part of the intensity
(Continued)

of the illumination of the collimated image is reflected by the reflector surface and transmitted by the partially-reflecting surface. Both parts of the intensity contribute to image illumination coupled into the LOE so as to propagate within the LOE by internal reflection at the major external surfaces.

17 Claims, 10 Drawing Sheets

Related U.S. Application Data on Oct. 28, 2021, provisional application No. 63/256, 882, filed on Oct. 18, 2021.

(51) Int. Cl.
*G02B 27/18* (2006.01)
*H04N 9/31* (2006.01)

(58) Field of Classification Search
CPC ........ G02B 27/42; G02B 27/46; G02B 27/48; G02B 26/10; G02B 26/101; G02B 6/00; G02B 6/0035; G02B 6/0016; G02B 6/0018; G02B 6/0055; G02B 6/0076; G02B 5/18; G02B 5/1814; G02B 5/1819; G02B 5/1842; G02B 5/1866; G02B 5/3083; H04N 9/31; H04N 9/3129; H04N 9/3141; H04N 9/3173
USPC ... 359/630–633, 13, 34, 569, 563, 558, 566, 359/489.07; 385/11, 31, 37
See application file for complete search history.

(56) References Cited

U.S. PATENT DOCUMENTS

| | | | |
|---|---|---|---|
| 11,644,676 | B2 | 5/2023 | Grabarnik et al. |
| 11,860,369 | B2 | 1/2024 | Chriki et al. |
| 2003/0165017 | A1 | 9/2003 | Amitai |
| 2019/0212487 | A1 | 7/2019 | Danziger et al. |
| 2020/0183159 | A1 | 6/2020 | Danziger |
| 2020/0310024 | A1 | 10/2020 | Danziger et al. |
| 2021/0072553 | A1 | 3/2021 | Danziger et al. |
| 2021/0247608 | A1 | 8/2021 | Elsenfeld et al. |
| 2022/0030205 | A1 | 1/2022 | Danziger |
| 2022/0269098 | A1 | 8/2022 | Danziger et al. |
| 2022/0357499 | A1 | 11/2022 | Danziger et al. |
| 2022/0390665 | A1 | 12/2022 | Grabarnik et al. |
| 2022/0390747 | A1 | 12/2022 | Eisenfeld |
| 2023/0051619 | A1 | 2/2023 | Eisenfeld et al. |
| 2023/0228932 | A1 | 7/2023 | Eisenfeld et al. |
| 2023/0251488 | A1 | 8/2023 | Ronen et al. |
| 2023/0266593 | A1 | 8/2023 | Eisenfeld |
| 2023/0305230 | A1 | 9/2023 | Chriki |
| 2023/0314689 | A1 | 10/2023 | Chriki et al. |
| 2023/0359034 | A1 | 11/2023 | Ronen |
| 2024/0176146 | A1 | 5/2024 | Chriki et al. |
| 2024/0337844 | A1 | 10/2024 | Danziger et al. |

OPTICAL SYSTEM FOR NEAR-EYE DISPLAYS

FIELD AND BACKGROUND OF THE INVENTION

The present invention relates to displays and, in particular, it concerns optical systems for near-eye displays which employ reflective coupling-in configurations between an image projector and a waveguide.

Near-eye displays typically employ a miniature projector (also referred to as a POD) which projects a collimated image. In order to convey the image opposite the user's eye and to expand the dimensions of the optical aperture, the image is typically coupled into a transparent waveguide (also referred to as a light-guide optical element or "LOE") within which it propagates by internal reflection at two major parallel surfaces, and from which it is progressively coupled-out towards the eye for viewing by the user.

FIGS. 1A-1C illustrate examples of a near-eye display optical engine. The display of FIG. 1A includes an image projector 200 that projects image light having an angular field through transmissive coupling prism 202T and through vertical aperture 203V into a waveguide 204. The light propagates in the waveguide, being reflected by total internal reflection. Partial reflectors (or "facets") 206 embedded in the waveguide in coupling-out area 210 reflect the image out of the waveguide (dashed arrows) towards the observer having eyeball center 208. FIG. 1B shows an alternative form of coupling into the waveguide by using reflective coupling prism 202R having a mirror on its back surface.

The waveguide configuration may achieve optical aperture expansion in one dimension or in two dimensions ("2D"). FIG. 1C shows schematically a front view of a 2D aperture expansion waveguide. Here image projector 200 injects an image through coupling prism 202 through lateral aperture 203L (203V is also present, but not visible from this orientation) into waveguide 204. The image light ray 220A propagates laterally in the waveguide as it reflects by total internal reflection (TIR) between the waveguide faces. Here two sets of facets are used: set 206L expand the aperture laterally by reflecting the guided image progressively to a different guided direction 220B while facets set 206V expand the aperture vertically by progressively coupling the image out from area 210 on the waveguide onto the observer's eye. The above are non-limiting examples of a class of displays to which the present invention pertains, but it should be understood that it may also be used to advantage in a wide range of other optical arrangements, including light guides employing diffractive optical elements, or combinations of reflective and diffractive elements, as is known in the art, and in contexts of other head-up displays such as for automotive applications.

Image projector 200 may employ a spatial light modulator (SLM) such as a liquid-crystal-on-silicon (LCOS) SLM, or may generate an image by synchronous modulation of a scanning beam of illumination, such as a laser beam. An example of the latter type of image projector is illustrated schematically in FIG. 2. A laser 6 transmits a light beam onto reflector 8. Lens 10 collimates the beam onto scanning mirrors 12. The scanning may be various mechanisms including: MEMS, Polygon, Resonating fiber, Galvo or other. The converging beam passes through lens 16 onto surface 18. In order to expand the beams, surface 18 typically includes a dispersing diffuser or micro lens array (MLA).

The beam is collimated by lenses 20 that transmit the beam though exit aperture 22 (shown here schematically) and into a waveguide. For uniform image quality, the beam impinging on exit aperture 22 should be wide enough to generate full illumination of the exit aperture 22, and the geometry of coupling the image into a waveguide should be such that it "fills" the input aperture of the waveguide. The illumination optics (lens 16) and collimating optics 20 are advantageously configured so the plane of mirrors 12 is imaged onto the entrance pupil of the waveguide, corresponding to the exit aperture 22, to achieve "pupil imaging," thereby ensuring that the light beams will be efficiently coupled so as to enter the waveguide during scanning. The illumination optics and the collimating optics can be implemented using refractive lenses as illustrated here, or using reflective lenses for one or both of the optical assemblies. In a modified configuration, image plane 18 may include an image modulating matrix that further enhances image resolution, such as an LCOS spatial light modulator, typically implemented with reflective optics and employing a polarizing beam splitter.

SUMMARY OF THE INVENTION

The present invention is an optical system for displays which employs a reflective coupling-in configuration between an image projector and a waveguide.

According to the teachings of an embodiment of the present invention there is provided, an optical system comprising: (a) a light-guide optical element (LOE) formed from transparent material and having mutually-parallel first and second major external surfaces for guiding light by internal reflection; (b) a projector configured to project illumination corresponding to a collimated image; (c) a reflective coupling-in assembly associated with the LOE and providing at least part of a coupling-in configuration, the coupling-in configuration having: (i) an image injection surface coplanar with the first major external surface, the projector being associated with the image injection surface and oriented such that the illumination is injected through the image injection surface, the image injection surface being internally reflective to light rays incident at angles of incidence greater than a critical angle for the major external surfaces, (ii) a reflector surface obliquely angled to the major external surfaces, and (iii) a partially-reflecting surface parallel to the reflector surface, the reflector surface and the partially-reflecting surface being deployed such that a first part of the intensity of the illumination of the collimated image is reflected by the partially-reflecting surface and a second part of the intensity of the illumination of the collimated image is reflected by the reflector surface and transmitted by the partially-reflecting surface, both the first and the second parts of the intensity contributing to image illumination coupled into the LOE so as to propagate within the LOE by internal reflection at the major external surfaces.

According to a further feature of an embodiment of the present invention, the projector is configured to project the illumination corresponding to the collimated image via an exit aperture, the illumination exiting the exit aperture with a chief ray defining an optical axis of the projector and with an angular field about the chief ray.

According to a further feature of an embodiment of the present invention, the exit aperture has a first dimension and wherein the LOE has an input optical aperture corresponding to the thickness of the LOE, wherein the collimated image projected via the exit aperture and reflected from each of the first coupling-in reflector and the second coupling-in reflector is insufficient to fill the input optical aperture of the LOE, and wherein the combination of the reflections of the collimated image from both the first and the second coupling-in reflectors fills the input optical aperture of the LOE.

According to a further feature of an embodiment of the present invention, the partially-reflecting surface is interposed between the image injection surface and the reflector surface such that the first part of the intensity of the illumination for at least the chief ray across the entirety of the exit aperture is reflected by the partially-reflecting surface and the second part of the intensity of the illumination for at least the chief ray across the entirety of the exit aperture is transmitted by the partially-reflecting surface, reflected by the reflector surface and transmitted by the partially-reflecting surface.

According to a further feature of an embodiment of the present invention, the reflector surface and the partially-reflecting surface are deployed such that the first part of the intensity of the illumination for the entirety of the angular field across the entirety of the exit aperture is reflected by the partially-reflecting surface and the second part of the intensity of the illumination for the entirety of the angular field across the entirety of the exit aperture is transmitted by the partially-reflecting surface, reflected by the reflector surface and transmitted by the partially-reflecting surface.

According to a further feature of an embodiment of the present invention, the reflective coupling-in assembly comprises: (a) a wedge prism attached to the LOE and providing a first surface obliquely angled to the major external surfaces; and (b) a parallel-faced plate attached to the first surface, wherein the partially-reflecting surface is provided at an interface between the wedge prism and the plate, and the reflector surface is provided at a second face of the plate.

According to a further feature of an embodiment of the present invention, the LOE is formed with an obliquely-angled edge surface, and wherein the reflective coupling-in assembly comprises a parallel-faced plate attached to the obliquely-angled edge surface, wherein the partially-reflecting surface is provided at an interface between the edge surface and the plate, and the reflector surface is provided at a second face of the plate.

According to a further feature of an embodiment of the present invention, the partially-reflecting surface is a reflective polarizer configured to reflect a first polarization and to transmit a second polarization.

According to a further feature of an embodiment of the present invention, there is also provided a quarter-wave plate associated with at least part of the image injection surface so as to convert light internally reflected at the image injection surface between the first and second polarizations.

According to a further feature of an embodiment of the present invention, the reflector surface and the partially reflecting surface are internal to the LOE and located between the first and second major external surfaces.

According to a further feature of an embodiment of the present invention, the reflector surface and the partially reflecting surface are part of a set of at least three mutually-parallel reflectors located between the first and second major external surfaces.

According to a further feature of an embodiment of the present invention, the projector comprises: (a) a light source generating at least one light beam; (b) a scanning arrangement deployed to deflect the at least one light beam in an angular scanning motion in at least one dimension; and (c) a modulator associated with the light source and the scanning arrangement, and deployed to modulate brightness of the at least one light beam synchronously with the angular scanning motion, wherein the deflected light beam is injected directly from the scanning arrangement through the image injection surface.

According to a further feature of an embodiment of the present invention, the projector comprises: (a) an illumination subsystem defining an illumination stop; (b) an image plane at which an image is formed; (c) an exit aperture through which the collimated image is delivered into the LOE; (d) illumination optics deployed in a light path between the illumination stop and the image plane; and (e) collimating optics deployed in a light path between the image plane and the exit aperture, wherein the illumination optics and the collimating optics are configured such that the illumination stop is imaged to the exit aperture.

According to a further feature of an embodiment of the present invention, the LOE has a thickness between the first and second major external surfaces, and wherein a plurality of the at least three mutually-parallel reflectors span differing parts of the thickness such that at least one ray of the illumination partially transmitted at a first of the mutually-parallel reflectors and at least partially reflected at a second of the mutually-parallel reflectors propagates within the LOE by internal reflection at the first and second major surfaces without impinging again on the first of the mutually-parallel reflectors.

According to a further feature of an embodiment of the present invention, the reflector surface has a first reflectivity, and wherein successive reflectors of the at least three mutually-parallel reflectors have sequentially-decreasing reflectivity.

According to a further feature of an embodiment of the present invention, the at least three mutually-parallel reflectors are in partially-overlapping relation such that a majority of rays of the illumination are at least partially reflected at at least two of the mutually-parallel reflectors.

According to a further feature of an embodiment of the present invention, the LOE has mutually-parallel third and fourth major external surfaces perpendicular to the first and second major external surfaces, the LOE guiding light by four-fold internal reflection at the first, second, third and fourth major external surfaces.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an optical system for displays which employs a reflective coupling-in configuration between an image projector and a waveguide.

The principles and operation of optical systems according to the present invention may be better understood with reference to the drawings and the accompanying description.

By way of introduction, one of the limiting factors in near-eye display design is the size and weight of the image projector required to fill the waveguide entrance pupil. These considerations are explained further with reference to FIGS. 3A-3D.

In order to obtain uniform intensity across the expanded aperture, the injected initial aperture of the beam should be uniform and should "fill" the waveguide. The term "fill" is used in this context to indicate that rays corresponding to each point (pixel) in both the direct image and the inverted image (that interchange during propagation by internal reflection along the LOE) are present across the entire thickness of a cross-section of the waveguide. Conceptually, this property implies that, if the waveguide were to be cut transversely at any point, and if an opaque sheet with a pinhole was then placed over the cut end, the pinhole could be placed anywhere across the waveguide thickness and would result in complete projected images of both the direct image and the corresponding inverted image. Where the waveguide to be filled is a rectangular cross-section waveguide in which an image propagates by four-fold internal reflection at two orthogonal pairs of major external surfaces, "filling" of the waveguide should be across both dimensions of the cross-section, such that a pinhole positioned at any point across the thickness or width of the waveguide would result in projection of all four corresponding images between which energy is exchanged during propagation.

Figure 1C:
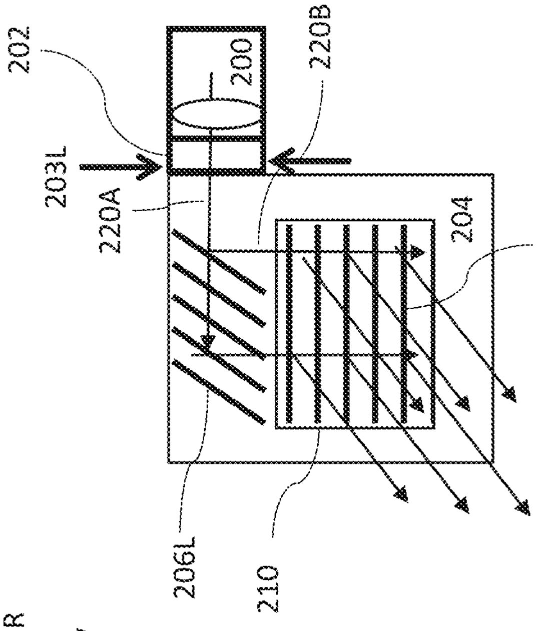
FIG. 1C (PRIOR ART)
FIG. 1C, described above, is a schematic front view of a third form of a conventional near-eye display.
Figure 1B:
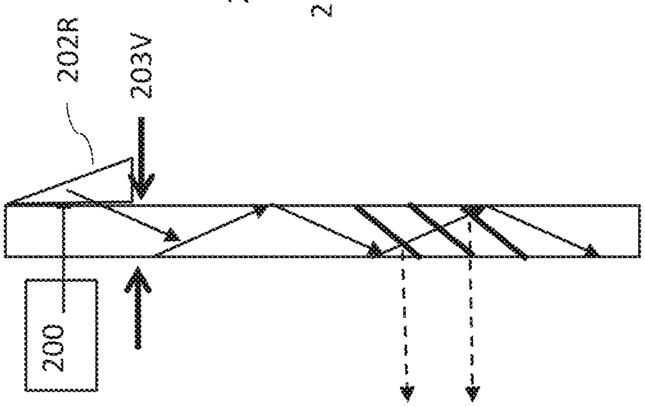
FIG. 1B (PRIOR ART)
FIG. 1B, described above, is a schematic side view of a second form of a conventional near-eye display.
Figure 1A:
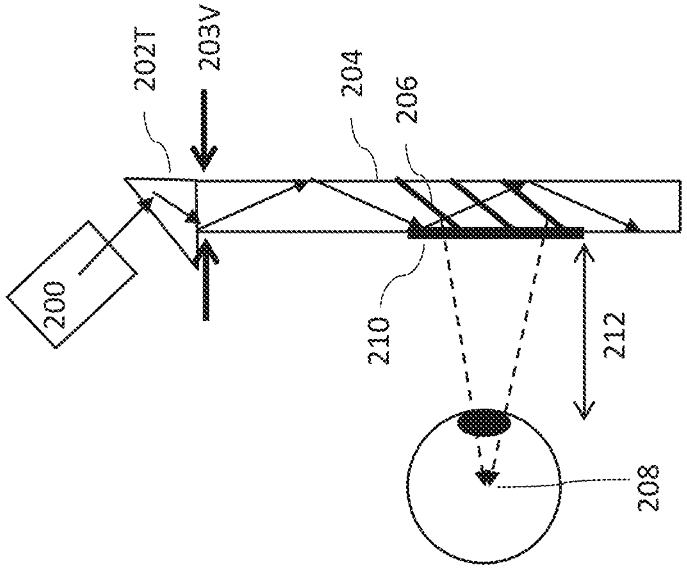
FIG. 1A (PRIOR ART)
FIG. 1A, described above, is a schematic side view of a first form of a conventional near-eye display.
Figure 2:
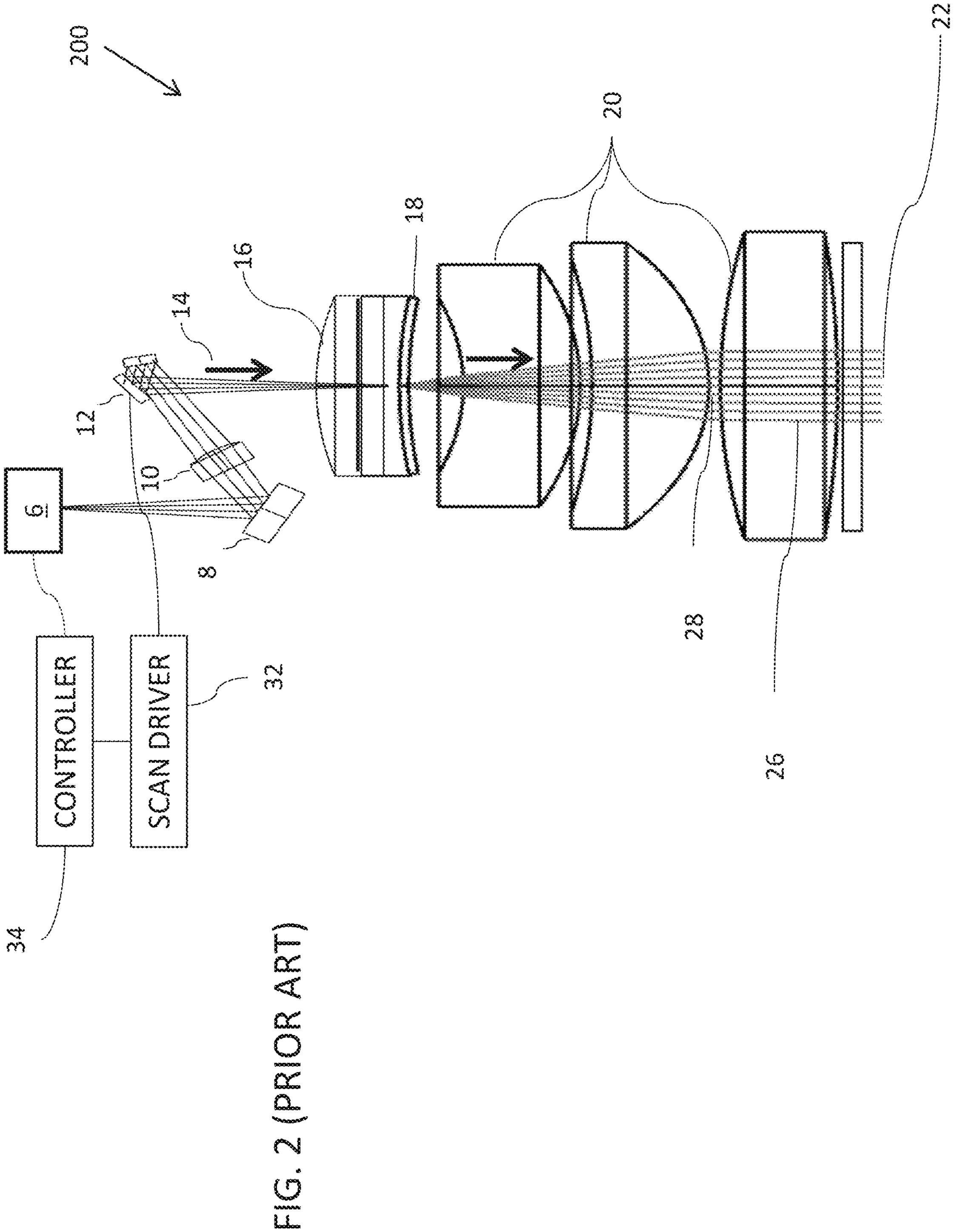
FIG. 2 (PRIOR ART)
FIG. 2, described above, is a schematic side view of an image projector for use in a conventional near-eye display.
Figure 3A:
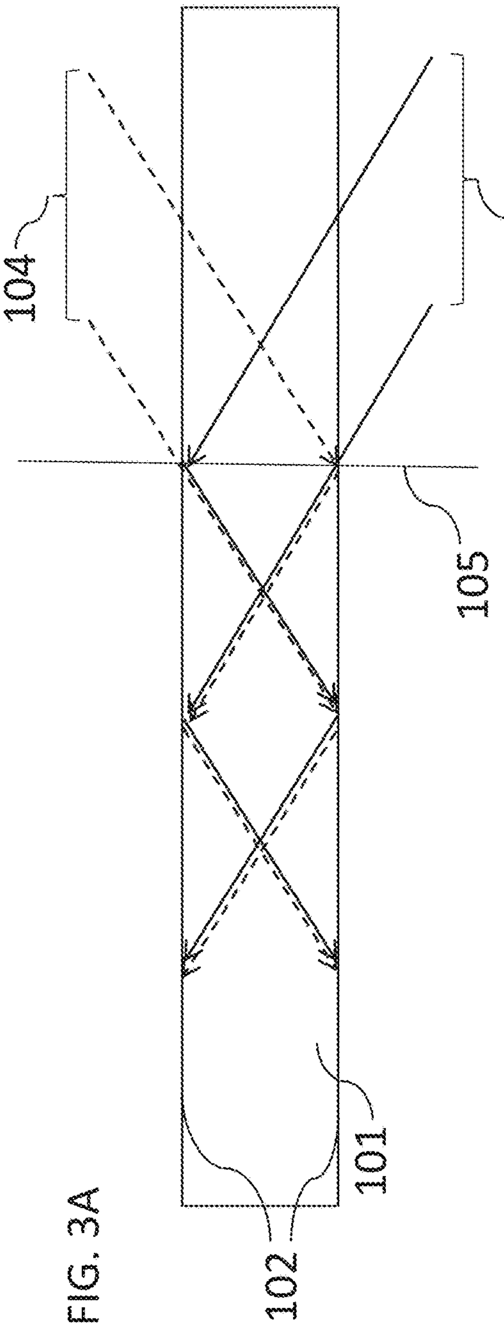
FIG. 3A is a schematic side view of a waveguide illustrating the conditions required for filling the thickness of the waveguide with an image.

A waveguide 101 is shown schematically in FIG. 3A. Light can propagate inside the waveguide by means of total internal reflection (TIR) from the major parallel waveguide surfaces 102. The waveguide aperture is filled for a given FOV point, if at any waveguide cross-section 105 there exist two beams 103 and 104, one beam (beam 103) propagating upwards, and the other beam (beam 104) propagating downwards.

Figure 3B:
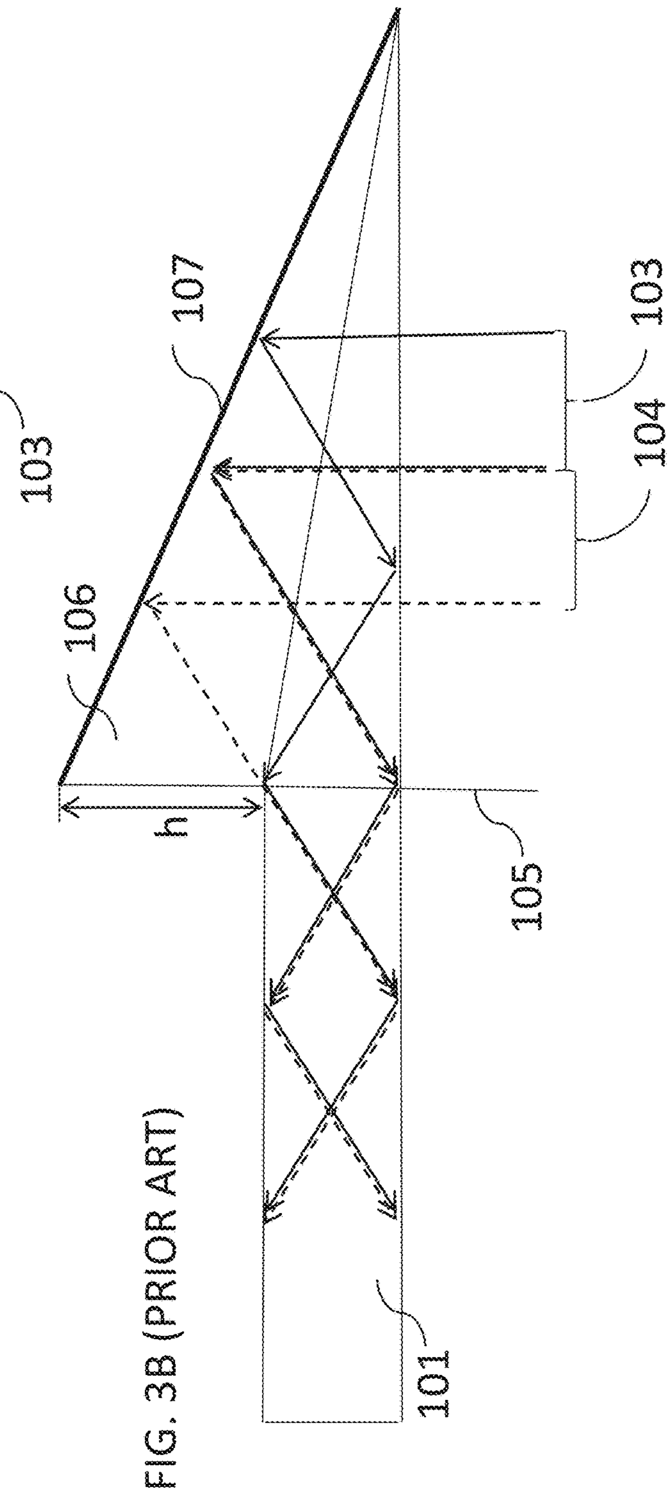
FIG. 3B (PRIOR ART)
FIG. 3B is a schematic side view of a waveguide illustrating conventional reflective coupling-in of an image and illustrating an aperture required to fill the waveguide with a chief ray of the image.

FIG. 3B illustrates coupling using a wedge 106 with a reflective surface 107. The beams 103 and 104 are emitted by the POD (not shown) and are guided inside the waveguide 101 by TIR after reflection from the wedge surface 107. However, beam 103 undergoes one more internal reflection than the beam 104 before reaching the waveguide entrance. As a result, at a waveguide cross-section 105, beam 103 propagates upwards, and beam 104 downwards, resulting in complete filling of the waveguide aperture.

Figure 3C:
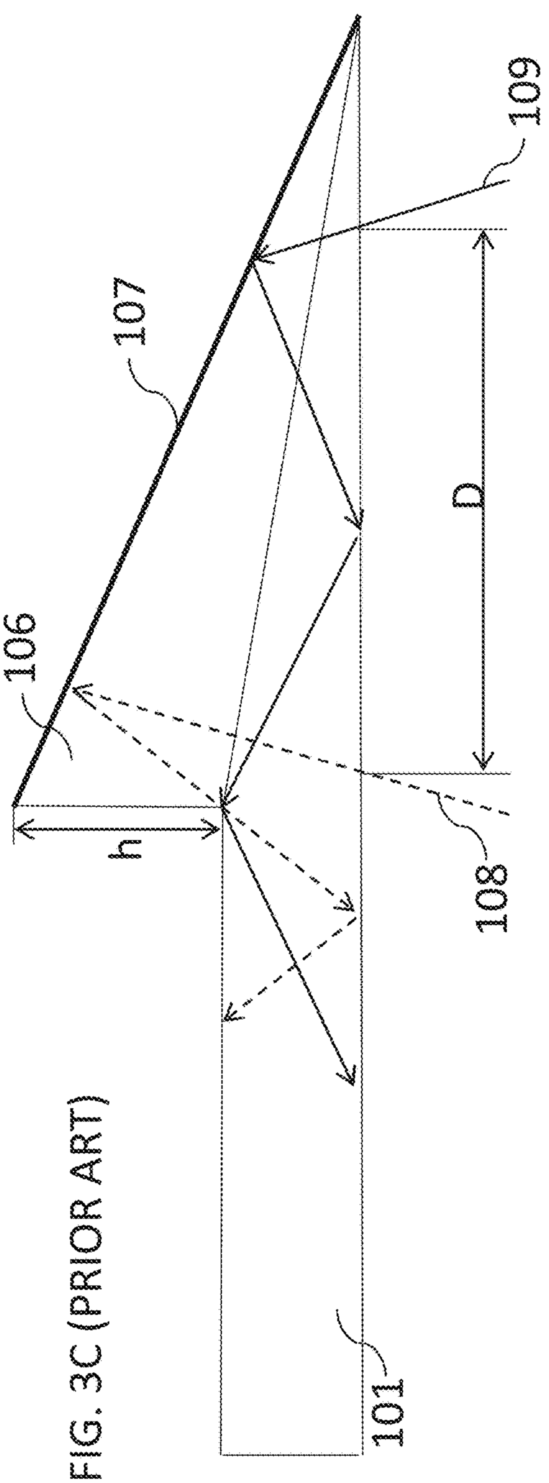
FIG. 3C (PRIOR ART)
FIG. 3C is a view similar to FIG. 3B illustrating the extreme rays of a field of view of an injected image which define a required aperture size for filling of the waveguide.
Figure 3D:
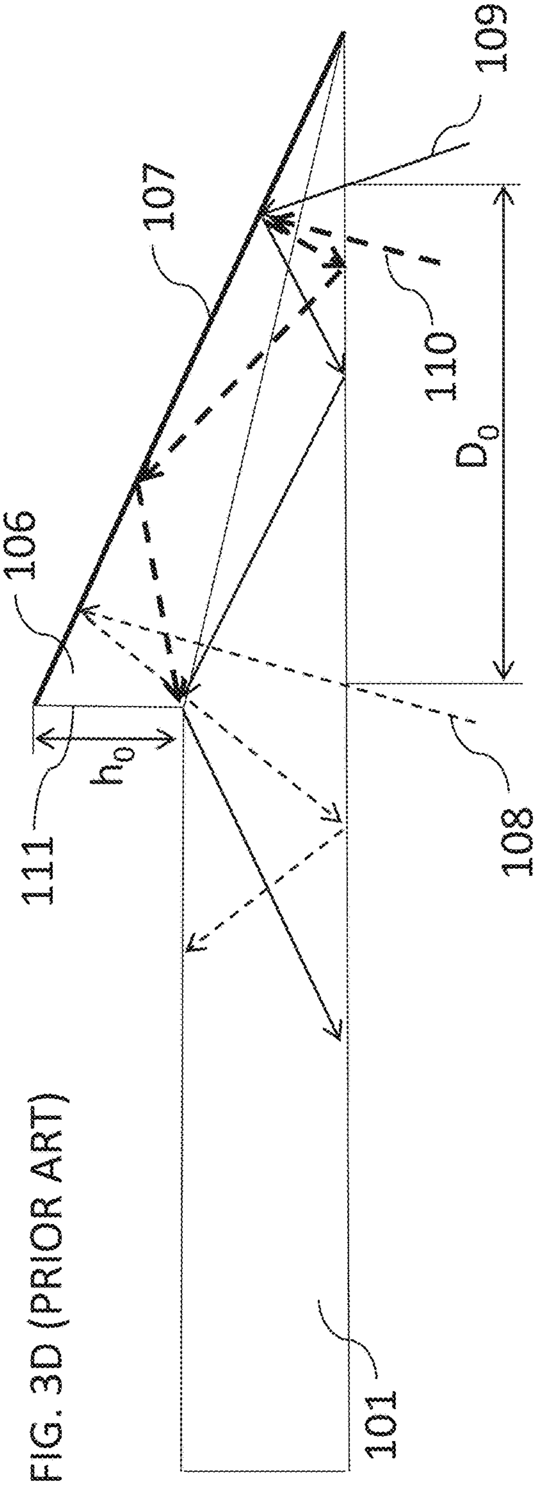
FIG. 3D (PRIOR ART)
FIG. 3D is a view similar to FIG. 3C illustrating a limiting condition for reduction in size of a reflective coupling-in prism according to the prior art.

FIG. 3C is similar to FIG. 3B, but illustrates rays corresponding to the extremities of an extended angular field-of-view (FOV) and the edges of the exit aperture of the POD. The POD aperture is defined by the edge rays 108 and 109 that belong to extreme FOVs as show in FIG. 3. The size of the POD aperture D becomes smaller as the coupling wedge height h decreases. However, as the wedge heights h decreases, a ray parallel to the ray 108 can undergo a second reflection from the wedge reflective surface 107 and became an unwanted ghost ray. In order to avoid degradation of the display, such a ray must be blocked by the surface 111 of the wedge as shown in FIG. 3D. In FIG. 3D, the height of the wedge ho is the minimum height at which the possible ghost rays are blocked by the wedge surface 111. The height ho defines the minimum possible POD aperture Do.

FIGS. 4-8 illustrate various implementations of an optical system, constructed and operative according to various embodiments of the present invention. Although the various embodiments are believed to have various patentably-distinct features, in generic terms, at least a subset of the embodiments can be described in generic terms as follows. The system includes a light-guide optical element (LOE) formed from transparent material and having mutually-parallel first and second major external surfaces for guiding light by internal reflection, a projector configured to project illumination corresponding to a collimated image, and a reflective coupling-in assembly associated with the LOE and providing at least part of a coupling-in configuration. The coupling-in configuration includes an image injection surface coplanar with the first major external surface, through which the image illumination is injected from through the image injection surface. The image injection surface is internally reflective to light rays incident at angles of incidence greater than a critical angle for the major external surfaces, either by leaving an air gap or other low-index material adjacent to the surface to provide conditions for total internal reflection or by providing an angularly-selective multi-layer dielectric coating, as is known in the art. The coupling-in configuration further includes a reflector surface obliquely angled to the major external surfaces, and a partially-reflecting surface parallel to the reflector surface. The reflector surface and the partially-reflecting surface are deployed such that a first part of the intensity of the illumination of the collimated image is reflected by the partially-reflecting surface and a second part of the intensity of the illumination of the collimated image is reflected by the reflector surface and transmitted by the partially-reflecting surface, both the first and the second parts of the intensity contributing to image illumination coupled into the LOE so as to propagate within the LOE by internal reflection at the major external surfaces.

Figure 4:
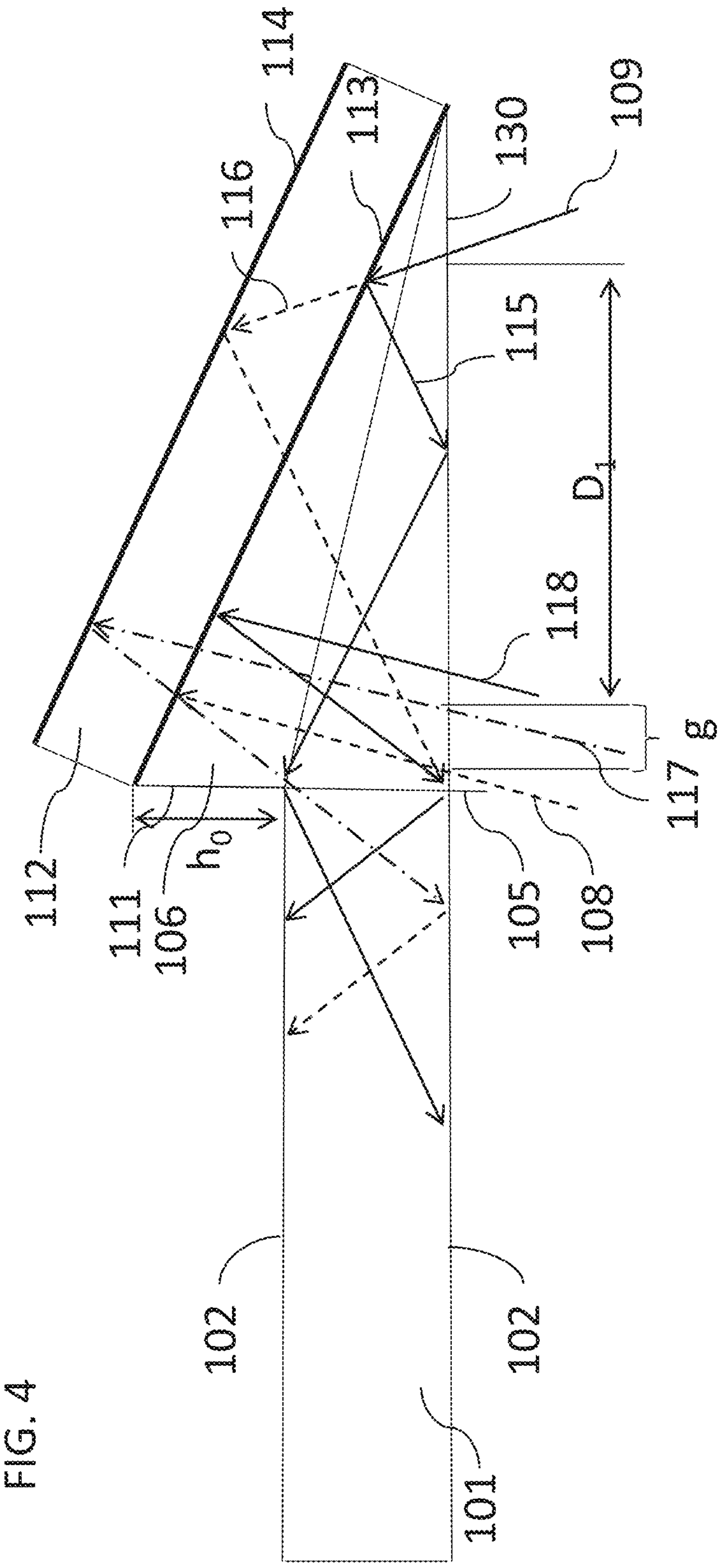
FIG. 4 is a schematic side view of an optical system, constructed and operative according to the teachings of an embodiment of the present invention, illustrating a reduction of the size of an optical aperture of FIG. 3D by employing a plurality of coupling-in reflectors with progressively increasing reflectivity.

FIG. 4 illustrates a first implementation of the optical system according to an embodiment of the present invention in which the reflective coupling-in assembly includes a wedge prism 106 attached to an LOE 101 that provides a first surface 113 obliquely angled to the major external surfaces 102, and a parallel-faced plate 112 attached to first surface 113. The partially-reflecting surface is provided at an interface between the wedge prism 106 and the plate 112 (corresponding to surface 113), and the reflector surface is provided at a second face 114 of the plate 112.

Wedge 106 is preferably chosen here to have a height ho beyond the LOE 101 corresponding to the minimal height required to avoid ghosts in the waveguide (as discussed above with the reference to FIG. 3D). Plate 112 is in optical contact with the wedge 106, with the interface at surface 113 preferably being semi-reflective, and the side 114 preferably being 100% reflective. In certain implementations, the reflectivity of the partially-reflective surface may be chosen to be about 38%, so that the reflected image has the same intensity as the twice-transmitted image. The reflector 114 generates beams that propagate downwards through the cross section 105 of the waveguide, as one can see in FIG. 4, where rays 109 and 117 are shown as examples. The semi-reflecting surface 113 generates beams that propagate both upwards and downwards at the cross section 105 of the waveguide.

Comparing FIG. 4 and FIG. 3D, one can see that the ray 108 is now replaced by the ray 117. As a result, the required POD aperture size can be made smaller by the distance between the rays 108 and 117 designated g.

It will be noted that wedge prism 106 and LOE 101 are preferably joined to form an optical continuum in this implementation. As a result, it is typically not critical where the two elements are joined. For example, in certain cases, the edge of LOE 101 may be formed with a tapered region to which a thin wedge portion is added, as suggested by the joint line illustrated in FIGS. 3B-3D. Alternatively, a thicker wedge can be attached to a flat end surface of LOE 101 corresponding to aperture 105 in FIG. 4. These two manufacturing options are optically equivalent. In the former case, the image injection surface 130 is actually integrally formed with the first major external surface 102 of LOE 101.

Although illustrated here with a single plate 112 that provides a total of two reflective coupling-in surfaces, it will be clear that the structure could be implemented using two or more such plates to provide three or more reflective coupling-in surfaces. In each case, the reflectivities of successive plates preferably vary progressively, with a lowest reflectivity at the first reflector encountered by the image illumination and successively increasing reflectivities up to a maximum reflectivity, typically 100%, at the last reflector.

Figure 5:
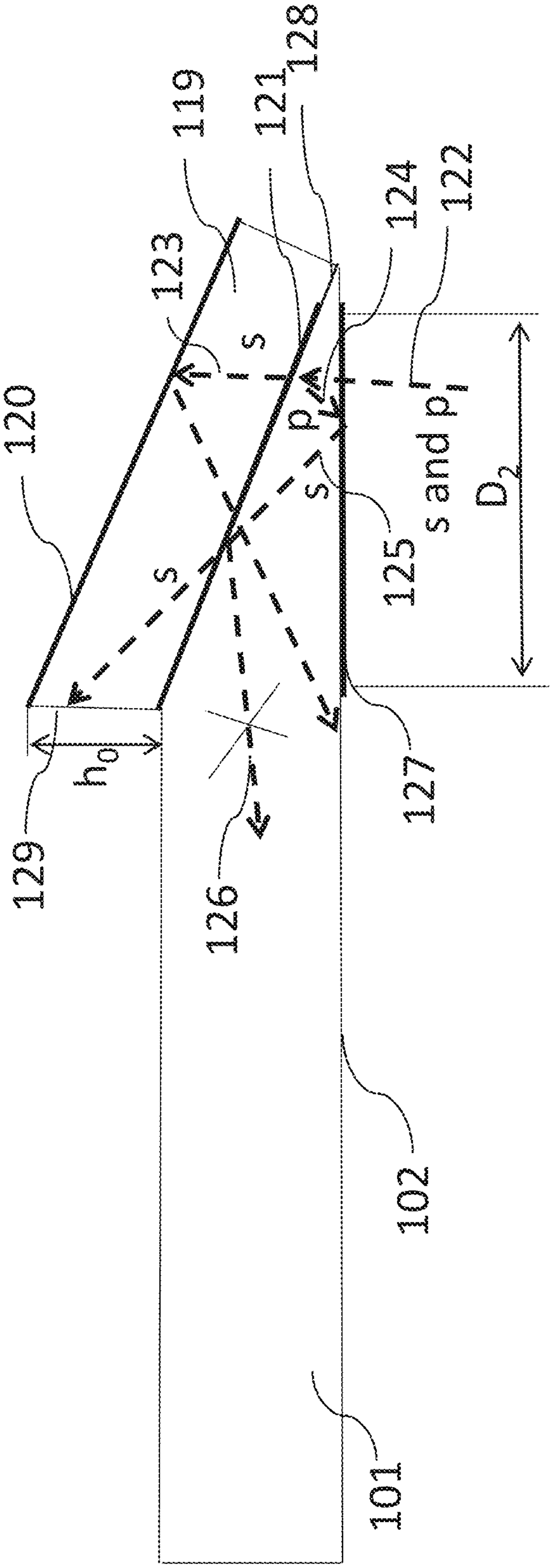
FIG. 5 is a view similar to FIG. 4 according to the teachings of an additional embodiment of an optical system of the present invention, illustrating a further reduction in the size of an optical aperture by employing a polarization-selective reflector as one of the coupling-in reflectors.

Turning now to FIG. 5, this illustrates a further option according to which LOE 101 is formed with an obliquely-angled edge surface 121, and the reflective coupling-in assembly is implemented using a parallel-faced plate 129 attached to the obliquely-angled edge surface 128. The partially-reflecting surface is provided at the interface between the edge surface 121 and the plate 129, and the reflector surface is provided at a second face 120 of the plate. This configuration is particularly useful when implemented with polarization management, where the partially-reflecting surface at 121 is a reflective polarizer configured to reflect a first polarization and to transmit a second polarization, while the reflector surface at 120 is reflective for at least the polarization transmitted by the partially-reflecting surface (and is typically implemented as a full reflector). A quarter-wave plate 127 is preferably associated with at least part of the image injection surface so as to convert light internally reflected at the image injection surface between the first and second polarizations.

The operation of this implementation may be understood by reference to the example illustrated, as follows. An unpolarized ray 122 enters through the waveplate 127 attached to the side 102 of the waveguide 101. The polarizer 121 splits the unpolarized ray 122 in to transmitted s-component (ray 123) and reflected p-component (ray 124). The ray 123 is reflected by the mirror 120 and further propagates inside the waveguide 101 by means of TIR. The ray 124 passes the waveplate 127, experiences a TIR and passes the waveplate 127 the second time. As a result, the polarization of the ray 124 changes, and it becomes s-polarized ray 125. The ray 125 hits the polarizer 121, but since its polarization has been switched to s, it is not reflected from polarizer 121 (which would have generated a ghost ray 126) but is instead transmitted and blocked by the side 129 of the plate 119.

In this manner, the arrangement shown in FIG. 5 eliminates the ghosts which would otherwise dictate the minimum height of the wedge ho in the arrangement shown in FIG. 4. As a result of this reduction of the wedge height (the wedge height in FIG. 5 is zero), the aperture of the POD $D_2$ can be reduced further as compared to the aperture $D_1$ in the arrangement shown in FIG. 4.

The implementations of both FIGS. 4 and 5 allow "filling" of the thickness dimension of the LOE with a projected image using a smaller projector aperture (and hence a smaller and lighter projector structure) than would be required to fill the aperture using a conventional reflective coupling-in configuration. Thus, if the exit aperture of the image projector has a first dimension $D_1$ or $D_2$, and the LOE has an input optical aperture 105 corresponding to the thickness of the LOE, the collimated image projected via the exit aperture and reflected from each of the coupling-in reflectors individually is insufficient to fill the input optical aperture 105 of the LOE 101, but the combination of the reflections of the collimated image from both of the coupling-in reflectors fills the input optical aperture of the LOE.

Alternatively, where incomplete filling of the aperture can be tolerated (such as where it is compensated for by additional element, such as a partially-reflecting internal surface 30 parallel to the major surfaces of the LOE as will be described further below with reference to FIGS. 7A-7C), the configurations of FIGS. 4 and 5 allow further reduction in the dimensions and weight of the projector while achieving more effective partial-filling and/or uniformity than would be achieved using a conventional coupling-in configuration.

In both of the above non-limiting examples, the partially-reflecting surface is interposed between the image injection surface and the reflector surface such that a first part of the intensity of the illumination for at least the chief ray across the entirety of the exit aperture is reflected by the partially-reflecting surface and the second part of the intensity of the illumination for at least the chief ray across the entirety of the exit aperture is transmitted by the partially-reflecting surface, reflected by the reflector surface and transmitted by the partially-reflecting surface. In certain preferred examples, the reflector surface and the partially-reflecting surface are deployed such that the first part of the intensity of the illumination for the entirety of the angular field across the entirety of the exit aperture is reflected by the partially-reflecting surface and the second part of the intensity of the illumination for the entirety of the angular field across the entirety of the exit aperture is transmitted by the partially-reflecting surface, reflected by the reflector surface and transmitted by the partially-reflecting surface.

The above arrangements can also be used for coupling-in either to a slab-type LOE which uses two major external surfaces to guide image illumination in one dimension, or to a rectangular cross-section LOE which uses four major external surfaces (two orthogonal pairs of parallel surfaces) to guide image illumination in two dimensions by four-fold internal reflection.

Turning now to FIGS. 6A-8, these illustrate a further group of implementations of the present invention in which the reflector surface and the partially reflecting surface are internal to the LOE and located between the first and second major external surfaces, and a referred to herein interchangeably as "facets." Depending on various design considerations which will be discussed further below, the reflector surface and the partially reflecting surface may advantageously be part of a set of at least three, and in some cases 4, 5 or more, mutually-parallel reflectors (facets) located between the first and second major external surfaces.

Figure 6A:
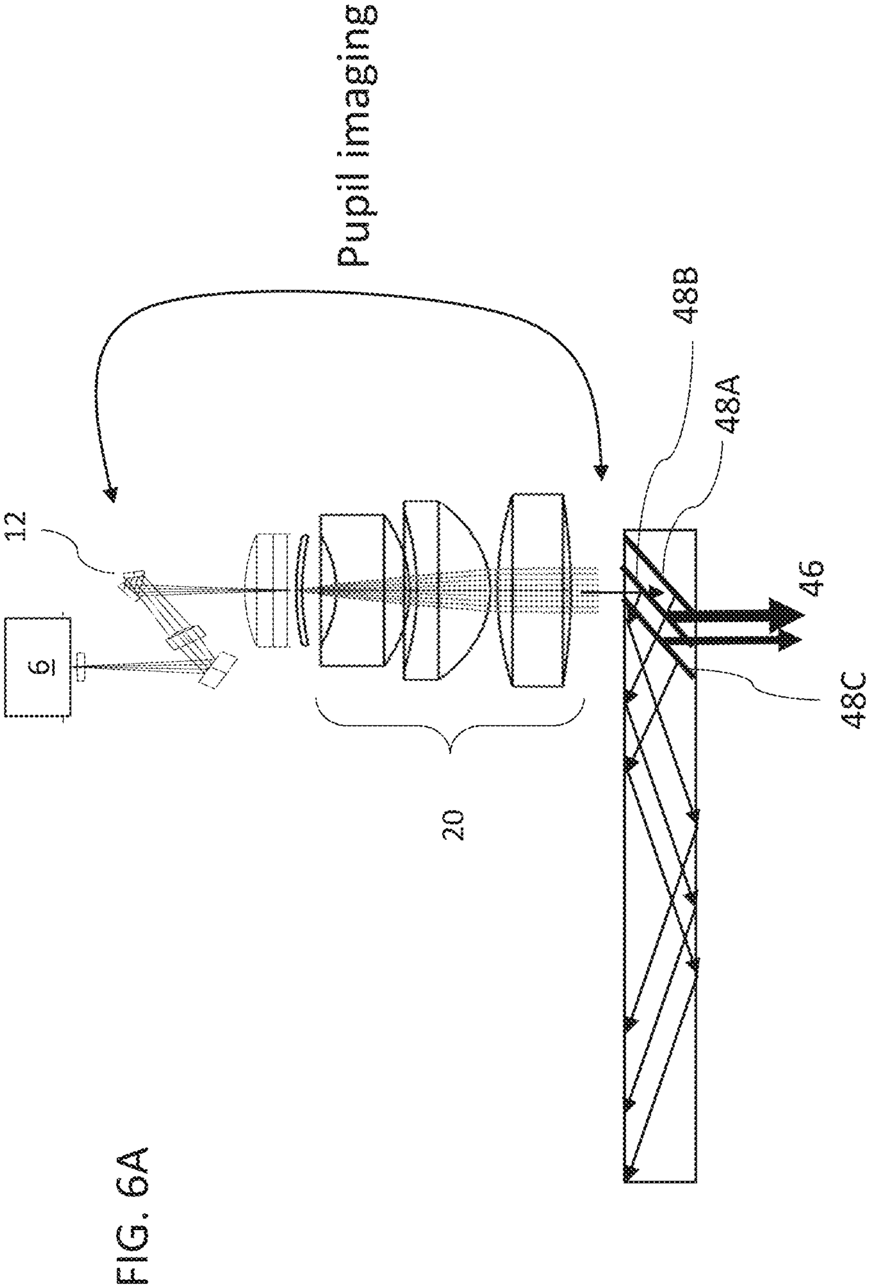
FIG. 6A is a schematic side view of a further embodiment of an optical system, constructed and operative according to the teachings of an embodiment of the present invention, illustrating coupling-in of an image into the waveguide by a plurality of coupling-in reflectors with progressively increasing reflectivity deployed within the waveguide thickness, the embodiment being illustrated with a scanning-laser image projector similar to that of FIG. 2, above.

FIG. 6A shows a combination of optics 20 with coupling facets 48. Optics 20 images the plane of the scanning mirror 12 onto the entrance to the waveguide where the facets 48 are located. Because the beam illuminates only one location, minimal number of facets 48 are needed and losses are relatively small.

Aperture expansion is achieved by using a few overlapping facets. For example, if the laser beam has width of 1 mm and facets width is 3 mm (full illumination of the facet is needed) then triple overlapping facets will do the aperture expansion (other overlapping numbers are possible). This is shown as facets 48A,48B and 48C (which are referred to herein in the text generically as facets 48 when addressed collectively). Working with a 1 mm laser beam, without further broadening of the beam by a micro-lens array, allows the use of highly compact optics 20, and thus a much smaller and lighter POD design than would otherwise be possible.

Preferably, facet 48A has maximal reflectivity (for example 100%), 48B has lower (for example 50%) and facet 48C has lowest reflectivity (for example 25%). Some light will be lost after multiple facets reflections, as indicated schematically by arrow 46. Tight spacing between the facets 48 can minimize this loss, since multiple reflections between adjacent facets will result in additional intensity being coupled into the waveguide and less being lost as losses 46, thereby increasing efficiency above the 25% starting-point of facet 48C of our example.

Although illustrated thus far in the non-limiting context of a laser-scanning image projector, the same principles and structurally-similar implementations can be used to advantage to reduce the aperture requirements, and hence the size and weight, of other types of image projector. By way of example, FIG. 6B shows implementation employing an image projector that uses an LCOS SLM and injects an image into the LOE via an arrangement of overlapping facets 49. The term "overlapping facets" is used here to refer to a geometry in which the at least three mutually-parallel reflectors are in partially-overlapping relation such that a majority of rays of the illumination are at least partially reflected at at least two of the mutually-parallel reflectors.

The image projector of this example includes a polarizing beam splitter 50, an LCOS chip 52 and a reflecting collimating lens 54 with an associated wave-plate. The size of this projecting system is substantially reduced when using a small output aperture into the waveguide, and aperture expansion is performed by the overlapping facets 49.

A further advantageous feature, illustrated in the context of FIG. 6B but equally applicable to other implementations of the invention that employ an overlapping-facet coupling-in arrangement, is the use of partially-reflective surfaces (facets) which span different parts of a thickness of the waveguide. Thus, as seen in FIG. 6B, the LOE has a thickness between the first and second major external surfaces, and a plurality of the facets span differing parts of the thickness such that at least one ray of the illumination partially transmitted at a first of the mutually-parallel reflectors and at least partially reflected at a second of the mutually-parallel reflectors propagates within the LOE by internal reflection at the first and second major surfaces without impinging again on the first of the mutually-parallel reflectors. The preferred profile within which the partially-reflecting surfaces are deployed corresponds to the volume within which rays from the image projector exit aperture can impinge on the facets. This in turn depends of the location of the exit aperture which, depending on the pupil imaging of the illumination stop (not shown here), may be at the surface of the LOE or somewhere within the LOE thickness. The resulting optimal deployment for the partially-reflecting coupling-in surfaces may thus correspond to a trapeze shape as viewed in cross-section (illustrated in FIG. 6B as dashed lines), or may be a rectangle or other shape, depending on the position of the exit aperture of the image projector. This exit aperture is an image of the illuminator surface 53.

As before, the successive reflectors of the at least three mutually-parallel reflectors preferably have sequentially-varying reflectivity, with a lowest reflectivity at the first reflector encountered by the injected image and sequentially-increasing reflectivity at subsequent facets, most preferably terminating in a full (100%) reflector at the last surface.

Figure 6C:
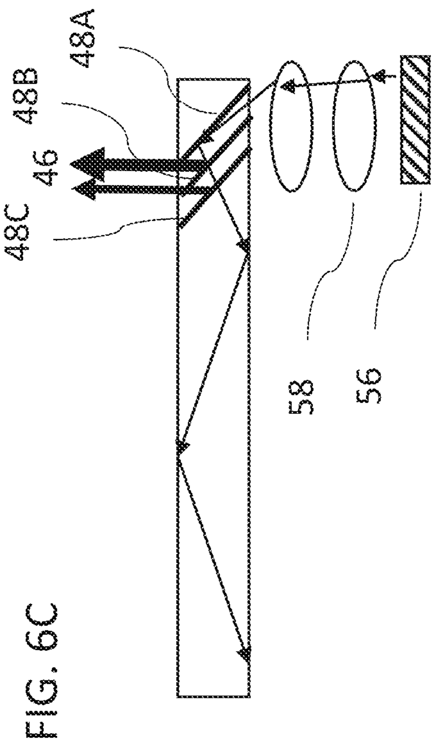
FIGS. 6B and 6C are views similar to FIG. 6A illustrating variant implementations of the optical system employing a reflective spatial-light modulator image projector and an active-matrix image projector, respectively.
Figure 6B:
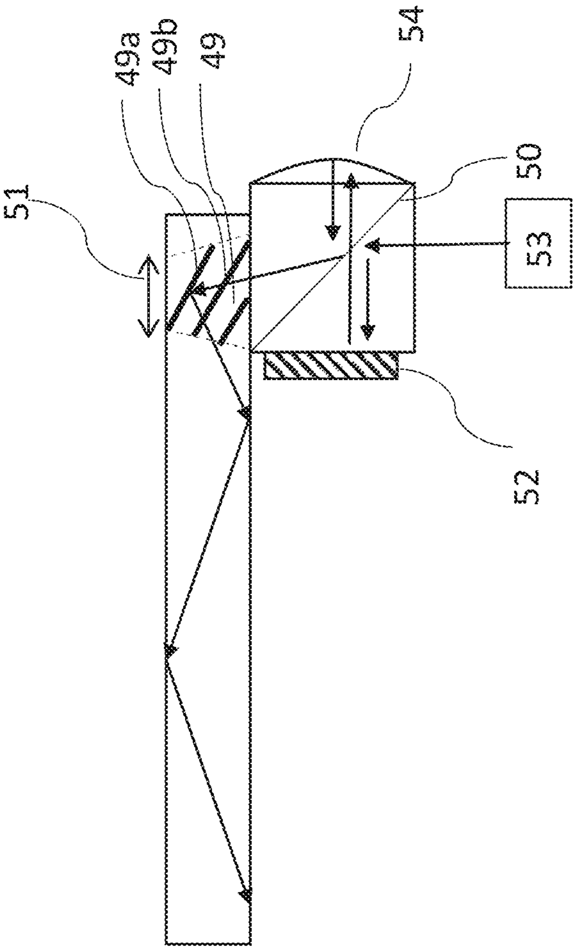

FIG. 6C shows schematically an implementation of the present invention using an image projector based on an active matrix (such as micro-LED) 56 projected through collimating lenses 58 and having an exit aperture on the overlapping facets 48.

The present invention has been described thus far in the context of an image projector which collimates the entirety of the projected collimated image fills a projector exit aperture which can be defined geometrically by a chief (central) ray of the image that can be taken to define an optical axis of the projector and an angular field about the chief ray. This allows the advantageous use of "pupil imaging" of an illumination stop to an exit aperture of the image projector.

However, certain implementations of the present invention employ direct injection of a scanning illumination beam from a scanning arrangement through the image injection surface of the optical system, i.e., without intervening components with optical power. Examples of such implementations are shown schematically in FIGS. 7A-7C. FIG. 7A shows the reflecting facets 140 overlapping in a manner equivalent to FIG. 6A but extending across the entire scanning footprint of the beam from a scanner 12. The spacing of the coupling-in facets is preferably such that every beam from the scanner 12 is partially reflected by at least two facets before residual light 46 (here shown as dashed arrows) escapes from the waveguide. A partial reflector 30 parallel to the major surfaces of the waveguide may optionally be included where further-enhanced uniformity is needed.

Figure 7A:
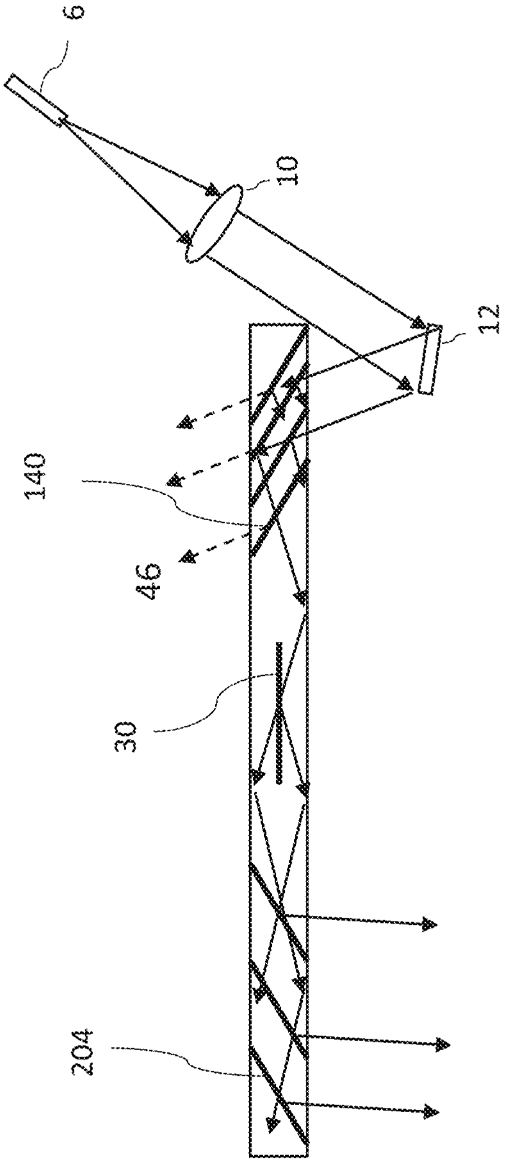
FIG. 7A is a schematic side view of a near-eye display illustrating a further variation of the embodiment of FIG. 6A employing direct coupling-in of a scanned illumination beam from a scanning mirror.

The orientation of the in-coupling facets 140 and the outcoupling facets 204 shown in FIG. 7A are not parallel. This allows injection of the image using a scanning arrangement on the same side of the LOE from which the user views the output image, which may have ergonomic and aesthetic advantages, but complicates manufacturing processes. An alternative implementation is possible in which the in-coupling facets and out-coupling facets are all parallel (not shown), which facilitates manufacture. In such an implementation, placement of the scanning arrangement 12 should be on the side of LOE further from the user.

Figure 7C:
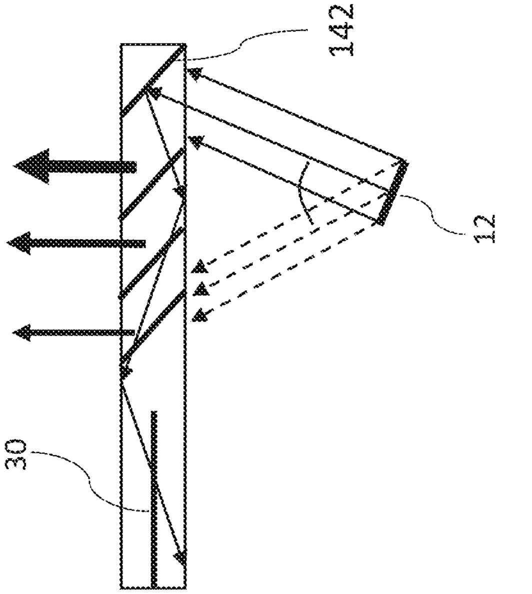
FIGS. 7B and 7C are partial views of the display of FIG. 7A illustrating variations in the amount of lost image illumination according to the spacing of internal coupling-in reflectors according to variant implementations of the present invention.
Figure 7B:
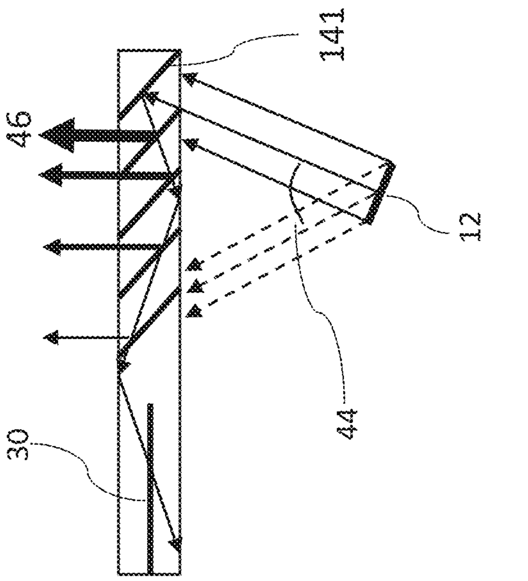

FIG. 7B shows in more detail the scanning field across the coupling-in facets 141 that redirect the image illumination into the waveguide. The positions of the two extreme angles of the scanned beams (solid and dashed arrows) define the number of facets 40 needed for the coupling-in. The larger the scan angle 44 and the distance of mirror 12 from the waveguide, the more facets are needed.

Assuming uniform power is required for all field angles and maximal efficiency is needed, then the first facet on the right will have 100% reflectivity, the second facet 50%, the third 25%, the fourth 12.5% and the fifth (last on the left in FIG. 5B) is 6.25%. Light from first facets will be coupled out as loss 46 so the total coupling efficiency can be approximated to be in the order of 6.25%. Overlapping facets (as in FIG. 7A or in FIG. 6A) will reduce this output coupling and thereby improve efficiency.

FIG. 7C shows an embodiment where the spacing between the facets 142 is varied according to the projection of the scanning beam on these facets. Consequently, the first facet (on the right) has large spacing to the next facet, while the spacing of the last facet (on the left) is narrower. Consequently, fewer facets are needed for such a configuration, and less energy is lost 46. In the example of FIG. 5C only four facets are needed thereby the efficiency is 12.5%, twice that of the configuration in FIG. 5B.

Figure 8:
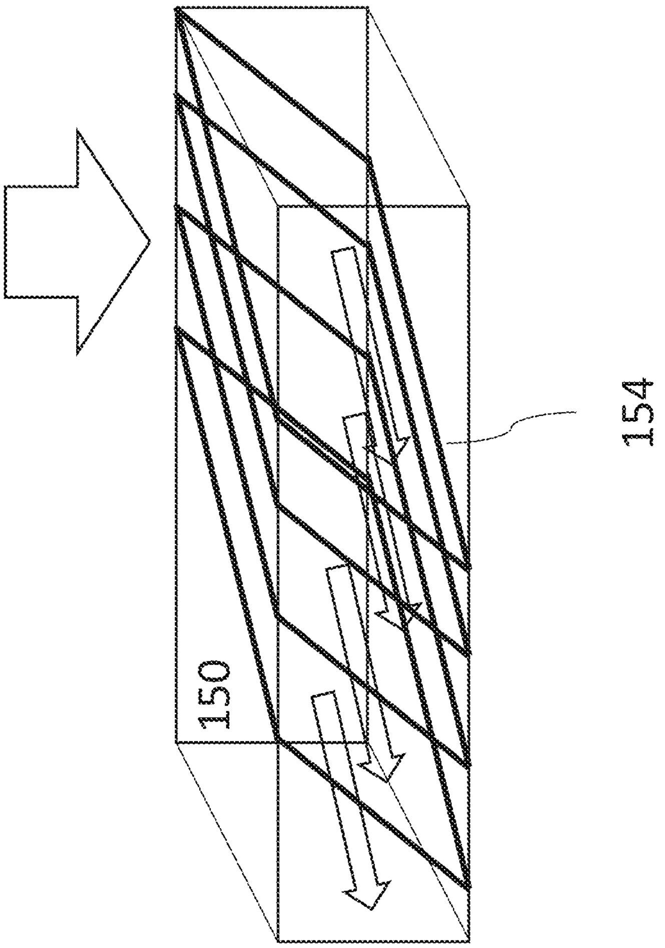
FIG. 8 is a schematic isometric view of a waveguide including a plurality of internal coupling-in reflectors that are deployed with an inclination relative to two axes of a rectangular waveguide, according to a further variant implementation of the present invention.

All the above coupling-in configurations can also be implemented for coupling into a 2D (rectangular cross-section) waveguide. This can be implemented in two ways:

1. Coupling into a 1D (slab type) waveguide section followed by coupling from that first section into a second 2D waveguide orthogonal to the first waveguide. The coupling of one or both of these transitions can be performed by a multiple facet arrangement as described above.
2. Alternatively, this approach may be used to couple in the projected image directly into a 2D waveguide using multiple facets that are tilted in two dimensions as shown in FIG. 8. In this case, all facets 154 are obliquely-inclined relative to both the x axis and the y axis (i.e., relative to both sets of orthogonal external surfaces) of the 2D waveguide 150.

It will be appreciated that the above descriptions are intended only to serve as examples, and that many other embodiments are possible within the scope of the present invention as defined in the appended claims.

What is claimed is:

1. An optical system comprising:

(a) a light-guide optical element (LOE) formed from transparent material and having mutually-parallel first and second major surfaces for guiding light by internal reflection;

(b) a projector configured to project illumination-light corresponding to a collimated image;

(c) a reflective coupling-in assembly associated with said LOE and providing at least part of a coupling-in configuration, said coupling-in configuration having:

(i) an image injection surface coplanar with said first major surface, said projector being associated with said image injection surface and oriented such that the light is injected through said image injection surface, said image injection surface being internally reflective to light rays incident at angles of incidence greater than a critical angle for said major surfaces, (ii) a second coupling-in reflector obliquely angled to said major surfaces, and (iii) a first coupling-in reflector parallel to said reflector surface, second coupling-in reflector, said first coupling-in reflector being partially-reflecting, said first and second coupling-in reflectors being deployed to redirect unguided light corresponding to the collimated image from said projector such that a first part of the intensity of the light corresponding to the collimated image is reflected by said first coupling-in reflector and a second part of the intensity of the light corresponding to the collimated image is reflected by said second coupling-in reflector and transmitted by said first coupling-in reflector, both said first and said second parts of the intensity contributing to image light coupled into said LOE so as to propagate within said LOE by internal reflection at said major surfaces.

2. The optical system of claim 1, wherein said projector is configured to project the light corresponding to the collimated image via an exit aperture, the light exiting said exit aperture with a chief ray defining an optical axis of said projector and with an angular field about the chief ray.

3. The optical system of claim 2, wherein said exit aperture has a first dimension and wherein said LOE has an input optical aperture corresponding to a thickness of said LOE, wherein the collimated image projected via said exit aperture and reflected from each of said first coupling-in reflector and said second coupling-in reflector is insufficient to fill said input optical aperture of said LOE, and wherein the combination of the reflections of the collimated image from both said first and said second coupling-in reflectors fills said input optical aperture of said LOE.

4. The optical system of claim 2, wherein said first coupling-in reflector is interposed between said image injection surface and said second coupling-in reflector such that said first part of the intensity of the light corresponding to the collimated image for at least the chief ray across the entirety of said exit aperture is reflected by said first coupling-in reflector and said second part of the intensity of the light corresponding to the collimated image for at least the chief ray across the entirety of said exit aperture is transmitted by said first coupling-in reflector, reflected by said second coupling-in reflector and transmitted by said first coupling-in reflector.

5. The optical system of claim 4, wherein said first and second coupling-in reflectors are deployed such that said first part of the intensity of the light corresponding to the collimated image for the entirety of the angular field across the entirety of said exit aperture is reflected by said first coupling-in reflector and said second part of the intensity of the illumination light corresponding to the collimated image for the entirety of the angular field across the entirety of said exit aperture is transmitted by said first coupling-in reflector, reflected by said second coupling-in reflector and transmitted by said first coupling-in reflector.

6. The optical system of claim 2, wherein said reflective coupling-in assembly comprises:
(a) a wedge prism attached to said LOE and providing a first surface obliquely angled to said major surfaces; and
(b) a parallel-faced plate attached to said first surface,
wherein said first coupling-in reflector is provided at an interface between said wedge prism and said plate, and said second coupling-in reflector is provided at a second face of said plate.

7. The optical system of claim 2, wherein said LOE is formed with an obliquely-angled edge surface, and wherein said reflective coupling-in assembly comprises a parallel-faced plate attached to said obliquely-angled edge surface, wherein said first coupling-in reflector is provided at an interface between said edge surface and said plate, and said second coupling-in reflector is provided at a second face of said plate.

8. The optical system of claim 2, wherein said first coupling-in reflector is a reflective polarizer configured to reflect a first polarization and to transmit a second polarization.

9. The optical system of claim 8, further comprising a quarter-wave plate associated with at least part of said image injection surface so as to convert light internally reflected at said image injection surface between said first and second polarizations.

10. The optical system of claim 1, wherein said first and second coupling-in reflectors are internal to said LOE and located between said first and second major surfaces.

11. The optical system of claim 10, wherein said first and second coupling-in reflectors are part of a set of at least three mutually-parallel reflectors located between said first and second major surfaces.

12. The optical system of claim 11, wherein said projector comprises:
(a) a light source generating at least one light beam;
(b) a scanning arrangement deployed to deflect the at least one light beam in an angular scanning motion in at least one dimension; and
(c) a modulator associated with said light source and said scanning arrangement, and deployed to modulate brightness of said at least one light beam synchronously with said angular scanning motion,
wherein said deflected light beam is injected directly from said scanning arrangement through said image injection surface.

13. The optical system of claim 11, wherein said projector comprises:
(a) an illumination subsystem defining an illumination stop;
(b) an image plane at which an image is formed;
(c) an exit aperture through which the collimated image is delivered into said LOE;
(d) illumination optics deployed in a light path between the illumination stop and the image plane; and
(e) collimating optics deployed in a light path between the image plane and the exit aperture,
wherein said illumination optics and said collimating optics are configured such that said illumination stop is imaged to said exit aperture.

14. The optical system of claim 13, wherein said LOE has a thickness between said first and second major surfaces, and wherein a plurality of said at least three mutually-parallel reflectors span differing parts of said thickness such that at least one ray of the light corresponding to the collimated image partially transmitted at a first of said mutually-parallel reflectors and at least partially reflected at a second of said mutually-parallel reflectors propagates within said LOE by internal reflection at said first and second major surfaces without impinging again on said first of said mutually-parallel reflectors.

15. The optical system of claim 11, wherein said second coupling-in reflector has a first reflectivity, and wherein successive reflectors of said at least three mutually-parallel reflectors have sequentially-decreasing reflectivity.

16. The optical system of claim 11, wherein said at least three mutually-parallel reflectors are in partially-overlapping relation such that a majority of rays of the light corresponding to the collimated image are at least partially reflected at at least two of said mutually-parallel reflectors.

17. The optical system of claim 1, wherein said LOE has mutually- parallel third and fourth major surfaces perpendicular to said first and second major surfaces, said LOE guiding light by four-fold internal reflection at said first, second, third and fourth major external-surfaces.

* * * * *